March 20, 1962 G. KORAB ET AL 3,026,132
DUAL LATCH STRUCTURE
Filed Aug. 28, 1959 2 Sheets-Sheet 2
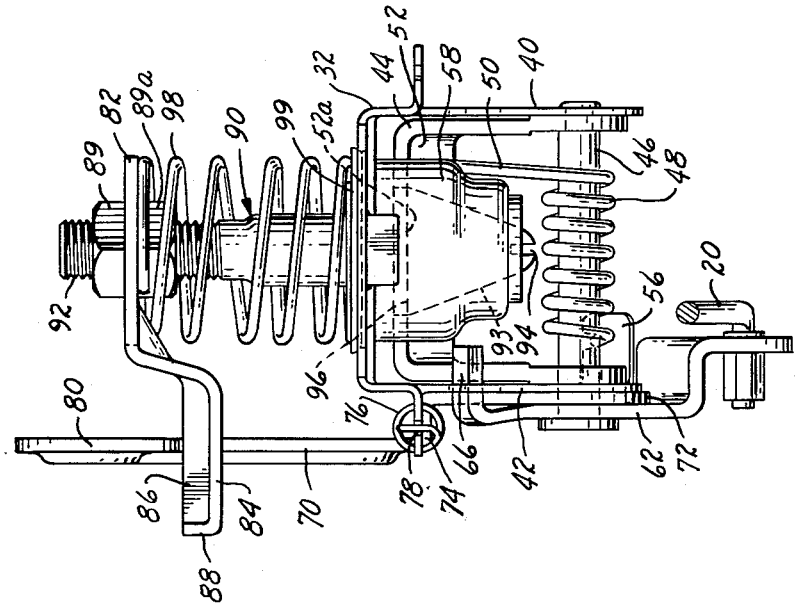
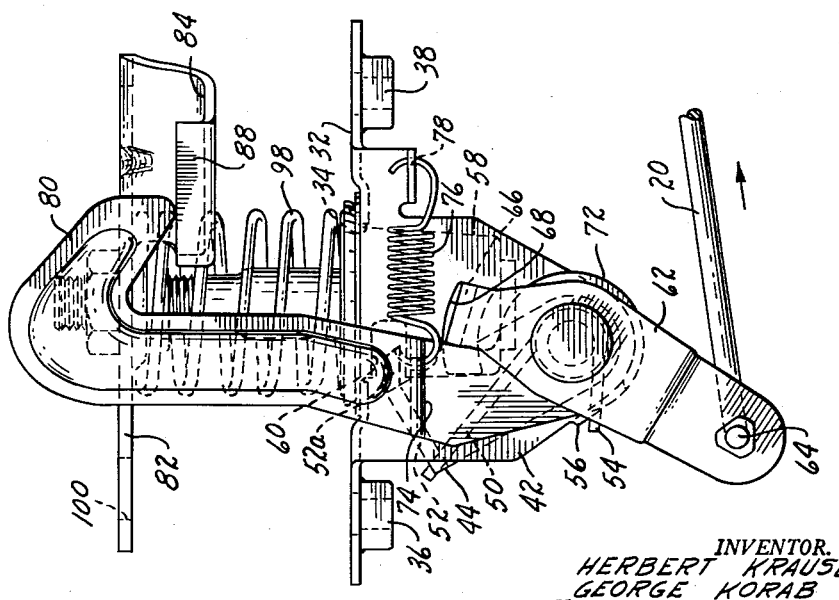
INVENTOR.
HERBERT KRAUSE
GEORGE KORAB
BY Parker & Carter
Attorneys.

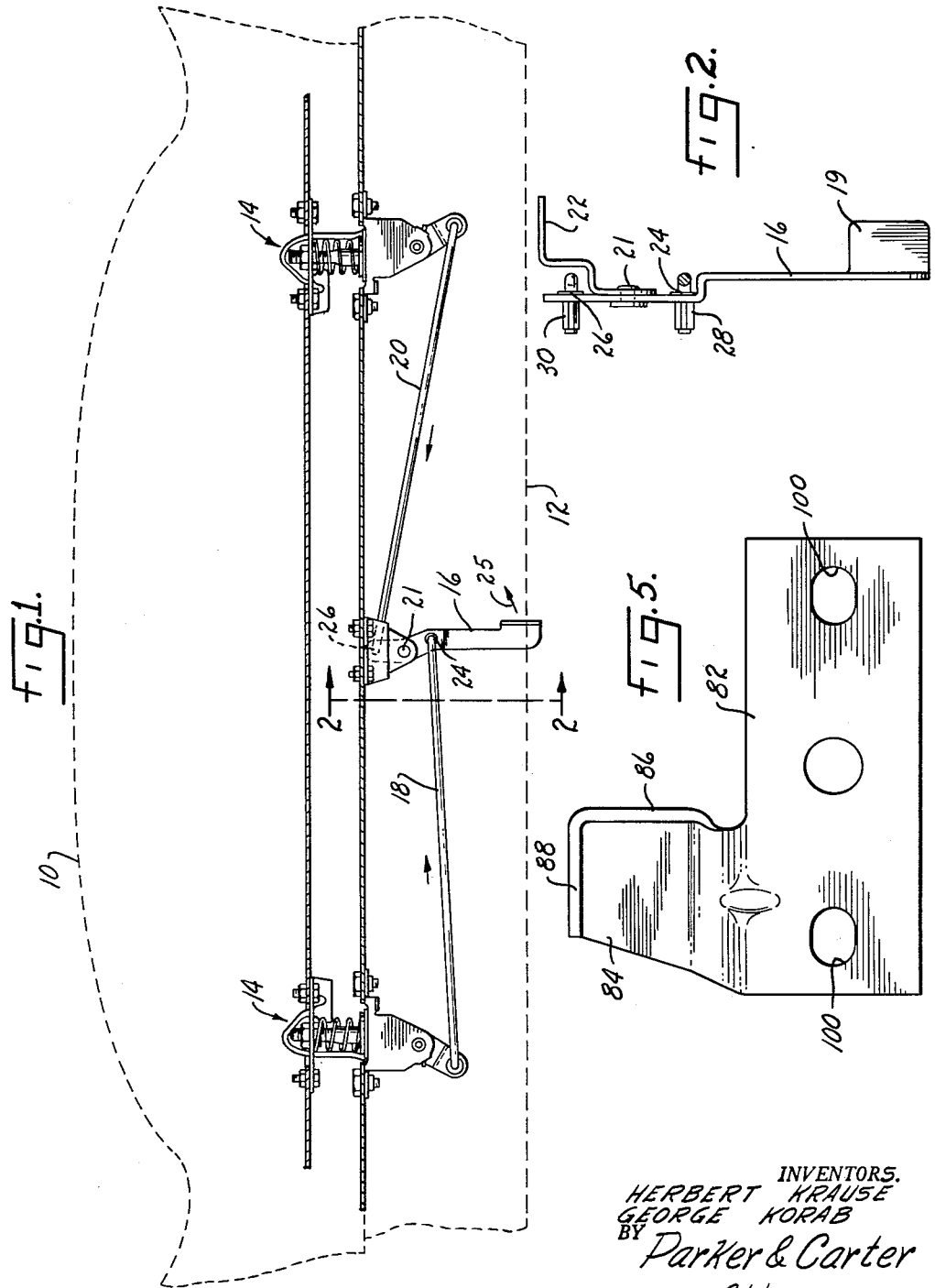

3,026,132
DUAL LATCH STRUCTURE
George Korab, Chicago, and Herbert Krause, Park Ridge, Ill., assignors to Chicago Forging & Manufacturing Co., Chicago, Ill., a corporation of Delaware
Filed Aug. 28, 1959, Ser. No. 836,656
2 Claims. (Cl. 292—11)

This invention relates to a latching structure suitable to secure the hood of an automobile, and in particular to a latching structure having a pair of spaced latching mechanisms operable from an intermediate location.

One purpose of the present invention is to provide a latching structure including a pair of spaced latching mechanisms each having a safety hook mounted thereon.

Another purpose is to provide a latching mechanism having a safety hook and a main latch adapted for sequential operation by a release member.

Another purpose is to provide a latching mechanism having a safety hook and a main latch pivoted about the same point and adapted for simultaneous and sequential operation by a release member.

Another purpose is to provide a latching structure including a pair of spaced main latches and a pair of spaced safety hooks associated therewith, all of said latching means being simultaneously operable by a centrally disposed actuating arm.

Other purposes will appear in the ensuing specification, drawings and claims.

The invention is illustrated diagrammatically in the accompanying drawings wherein:

FIG. 1 is a front view of the latching structure disclosed herein as applied to the hood and body of an automobile;

FIG. 2 is a view taken along line 2—2 of FIG. 1;

FIG. 3 is an enlarged front view of the latch mechanism used in the latching structure shown herein;

FIG. 4 is a view from the right side of the latch mechanism of FIG. 3; and

FIG. 5 is a top plan view of a safety hook latch plate used herein.

Like parts are indicated by like numerals throughout the specification and drawings.

Referring now to FIG. 1, a hood 10 and a body 12 of a typical automobile are indicated in broken lines. As shown in the drawings, the latching structure disclosed herein comprises a pair of spaced latch mechanisms 14 and a central or intermediately spaced actuating arm 16. The actuating arm 16 is connected to and operates the latch mechanisms through a pair of elongated rods or members 18 and 20. As shown in FIG. 1, the latch mechanisms are secured to the automobile so that the latch plate is positioned on the body of the automobile and the keeper structure is positioned on and secured to the hood of the automobile. It should be understood, however, that this particular arrangement may be reversed with equally satisfactory results.

In FIG. 2 the details of the actuating arm are shown. The actuating arm 16 has a hand grip 19 at one end and is fastened at pivot point 21 by a suitable rivet or the like to a mounting member 22 which may be suitably secured, as by screws or bolts, to the body of the automobile. On each side of the pivot point are connecting or pivot points 24, 26 which provide suitable connections for elongated rods 18 and 20. In the preferred form the rods 18 and 20 are inserted through apertures in the actuating arm and are then secured by plastic fasteners or the like 28 and 30. It can be seen from FIGS. 1 and 2 that rotation of the actuating arm in the direction of the arrow 25 rotates the arm 16 around pivot point 21 and moves both of the elongated rods toward the center of the automobile or toward the actuating arm. This movement will release the latch mechanisms hereinafter described.

The latch mechanisms shown in FIG. 1 and indicated at 14 are identical, with only the placement of parts being reversed. Therefore, only one latching mechanism will be described herein. A latch plate 32 has a central aperture or keeper-receiving aperture 34 therein and is adapted to be mounted on the body or hood of the automobile, as the case may be, through mounting means 36, 38. The latch plate 32 has a pair of side walls 40 and 42 whereby the latch plate forms an enclosure to receive the keeper. Within the latch plate 32 and mounted for pivotal or rotational movement thereon is a latch member 44. The latch member is secured to the latch plate by a rod, or the like, 46 which extends between the latch plate walls 40 and 42. A spring or yielding means 48 is wound around the rod 46 and has an end portion 50 in contact with a bridge portion 52 of the latch member. The other end portion 54 of the spring is adapted to contact and abut a projecting portion 56 on the side wall 42. The bridge 52 of the latch member is biased by spring 48 so that a latching portion 52a, which is integral with and angularly offset from the bridge portion 52, may be directed toward and may be used to lock the keeper, hereinafter described, in the latch plate. Placed within the latch plate 32 is a generally cylindrical keeper-receiving member 58 which is aligned with the aperture 34 and is adapted to receive the keeper. As can be seen in FIG. 4, the lower portion of the keeper-receiving member 58 is inwardly offset so that it more closely defines the tapered keeper. The bottom of the member 58 is open so that the keeper may extend completely therethrough. In FIG. 3 it can be seen that there is a slot 60 in the upper portion of member 58 adjacent its mounting to the latch plate 32a to receive the bridge portion 52 and the latching portion 52a thereof so that the portion 52a may engage the keeper.

In order to release the latch member, and so release the keeper, a release member 62 is pivoted on rod 46 outside of the latch plate 32. As shown in the drawings, the lower portion of the release member 62 is suitably connected at pivot point 64 to one of the elongated rods which operates the latch mechanism. The upper portion of release member 62 has an inwardly directed tab or actuating portion 66 which extends through an arcuate slot 68 in side wall 42. As can be clearly seen in FIG. 3, the inwardly extending portion 66 contacts an abutment portion 68 on the latch member so that rotational or pivotal movement of the release member in a counterclockwise direction will move the latch member in a counterclockwise direction, and so move the portion 52a out of slot 60 and away from the keeper.

A safety hook 70 extends generally parallel to and toward the keeper and is pivotally or rotationally mounted on rod 46 adjacent the release member and the latch member. The safety hook 70 has a portion 72 positioned between the release member and side wall 42 so that pivotal movement of release member portion 66 will move the safety hook in a counterclockwise direction. Directly above the portion 72 is an outwardly offset portion 74 upon which is mounted a spring 76, the other end of which is connected to the latch plate 32 as at 78. The spring 76 then biases or pulls the safety hook in a clockwise direction against the action of the release member. The upper portion of the safety hook 70 has a hook portion 80 projecting therefrom and overlying a safety hook latch plate 82.

The safety hook latch plate 82, clearly shown in FIG. 5, has a downwardly offset portion 84, as shown in the drawings, which underlies the hook 80 and has upwardly bent side portions 86, 88 which form a pocket to receive the hook portion 80. The plate 82 is mounted through securing means 89 and 89a to a keeper, indicated generally at 90. One of the nuts 89 or 89a may be spot welded to plate 82. The upper portion of the keeper, as shown in the drawings, is threaded as at 92 to receive the securing means 89 and 89a and so secure the safety hook latch plate 82. The lower portion of the keeper has an enlarged tapered head portion 93 with a tool-receiving slot 94 at the end thereof. The tapered portion 93 is adapted to be received in the latch plate 32 and secured therein by the latch member 44. When the keeper is completely received within the latch plate 32 it is held therein by the portion 52a of the latch member which is in contact with shoulder 96 formed where the tapered head 93 is joined to the shank of the keeper. A coiled spring 98 surrounds the keeper and is seated against safety hook latch plate 82 at one end and against a keeper spring-receiving member 99 at the other end. When the keeper is secured in the latch plate the spring 98 biases or forces the safety hook latch plate upward, as shown in the drawings, and so keeps the shoulder portion 96 of the keeper in tight contact with the portion 52a of the latch member. The safety hook latch plate is completed by a pair of mounting holes 100 which are used to mount the safety hook latch plate and the keeper structure to the hood of an automobile.

The use, operation and function of the invention are as follows:

We have shown and described herein an improved latching structure suitable for use on the most recent type of automobiles wherein the hood structure is quite wide and generally covers the whole width of the automobile. In order to adequately secure such a hood to the body of the automobile we have placed a pair of latch mechanisms generally adjacent each side of the hood. These latch mechanisms each include a safety hook which prevents upward movement of the hood even though the main latching portion of the latch mechanisms be released. Both the main latching portion and the safety hook of each of the latch mechanisms is operated by a centrally disposed actuating arm placed intermediate the latch mechanisms. Movement of the actuating arm in one direction releases the complete latching structure.

In the operation of our improved latching structure, as the hood of the automobile moves down toward the body the portions 84 of the safety hook latch plates 82 will first contact the hook portions 80 of the safety hooks. Continued downward movement of the hood will cause the safety hooks to rotate in a counterclockwise direction until the safety hook latch plates have completely passed the hooks, after which the hooks will be pulled by springs 76 so that they overlie the portions 84. At the same time the keepers 90 are entering the keeper-receiving structures or latch plates 32. The tapered head portions of the keepers contact portions 52a of the latch members and force the latch members to move against the action of springs 48. Continued downward movement of the keepers will move the latch members sufficiently to permit the keepers to be received completely within the latch plates 32. Once the keepers have passed by the latch members springs 48 will move the portions 52a into contact with shoulders 96 to lock the keepers within the latching structure. The latch mechanisms are now completely locked both by the safety hooks which overlie the safety hook latch plates, and by the keepers which are received and locked within the latch plates.

In order to release the latching structure shown herein the actuating arm 16 is moved in a counterclockwise direction. This moves both of the elongated rods 18 and 20 toward the center of the structure or toward the actuating arm which causes rotation of the release members.

Pivotal or rotational movement of the release members will move the latch members out of engagement with the shoulders 96 of the keepers and so permit the springs 98 to force the keepers upwardly and out of the latch plates. Simultaneously with the operation of the latch members the safety hooks are also being rotated by the release members 62. The release members move the safety hooks against the action of springs 76 so that the hook portions do not overlie the safety hook latch plates. This permits complete upward movement of the hood.

The particular placement of the release member in each latch mechanism provides simultaneous and sequential operation of the latch member and the safety hook. In other words, as the projecting portion 66 of the release member moves in the arcuate slot it will pivot or rotates the latching member and at the same time move the safety hook so it does not obstruct upward movement of the hood. Even though the keeper is released by movement of the latch member out of its path, the safety hook will still overlie the safety hook latch plate until the release member has moved completely through its path. Both the latch member and the safety hook are simultaneously and sequentially released by the release member in that the latching member is first moved out of position and then continued movement of the release member removes the safety hook from the upward path of the hood.

Whereas we have described and shown one form of the invention, it should be understood that there are many modifications, alterations and substitutions thereto coming within the scope of the following claims.

We claim:

1. A latching structure comprising a pair of spaced, aligned latching mechanisms each including a safety latch and a main latch, said main latches lying in substantially the same vertical plane and yieldingly urged toward each other and toward latching position, said safety latches lying in substantially the same vertical plane and yieldingly urged toward each other and toward latching position, means for simultaneously releasing the main latches and safety latches on both said mechanisms, including a pivotable actuating arm positioned intermediate said mechanisms, a pair of operating rods, each said rod having one of its ends pivotally connected to said actuating arm on an opposite side of said actuating arm pivot point, pivotal movement of said actuating arm moving both of said operating rods in opposite directions and toward said arm, each of said operating rods having its opposite end pivotally connected to an operating lever, each said operating lever being pivotally mounted on one of said latching mechanisms and having an operating engagement with the main and safety latches on its associated mechanism whereby pivotal movement of said actuating arm, through the mediacy of said rods and operating levers, is effective to produce the simultaneous release of both main latches and both safety latches.

2. The structure of claim 1 further characterized in that said actuating arm moves in a path generally parallel to the path of movement of said rods and wherein said main latch, safety latch and operating lever constitute separate elements in each said mechanism, said main latch, safety latch and operating lever being mounted on the same pivot point in each said mechanism.

References Cited in the file of this patent

UNITED STATES PATENTS

| | | |
|---|---|---|
| 2,274,711 | Krause | Mar. 3, 1942 |
| 2,312,578 | Northrup et al. | Mar. 2, 1943 |
| 2,828,989 | Kaiser | Apr. 1, 1958 |
| 2,841,430 | Krause | July 1, 1958 |
| 2,859,062 | Hynes | Nov. 4, 1958 |